(12) United States Patent
Kanameda et al.

(10) Patent No.: US 6,243,633 B1
(45) Date of Patent: *Jun. 5, 2001

(54) START CONTROLLING METHOD FOR A PASSENGER PROTECTION SYSTEM, AND START CONTROLLING SYSTEM FOR A PASSENGER PROTECTION SYSTEM, AND RECORDING MEDIUM FOR RECORDING START CONTROL PROGRAM FOR PASSENGER PROTECTION SYSTEM

(75) Inventors: Yasumasa Kanameda; Jörg Heckel; Koichi Miyaguchi, all of Tomioka (JP)

(73) Assignee: Bosch Electronics Corporation, Gunma (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/383,011

(22) Filed: Aug. 25, 1999

(30) Foreign Application Priority Data

Sep. 4, 1998 (JP) .................................. 10-265790

(51) Int. Cl.$^7$ .............................. G06F 7/00; G05D 1/00; B60R 22/00
(52) U.S. Cl. .............................. 701/45; 701/46; 180/271; 180/282; 280/734; 340/436
(58) Field of Search .................................. 701/45, 46, 36; 340/436, 438, 669; 307/10.1; 780/271, 282, 274, 268; 280/734, 735, 731, 728.1

(56) References Cited

U.S. PATENT DOCUMENTS 5,343,394 * 8/1994 Takeuchi et al. ....................... 701/45
5,363,301 * 11/1994 Takeuchi ............................... 701/46
5,440,485 * 8/1995 Okimoto et al. ....................... 701/46
5,483,451 * 1/1996 Ohmae et al. ......................... 701/46
5,490,067 * 2/1996 Teguri et al. .......................... 701/46
5,530,649 * 6/1996 Fujishima .............................. 701/46
5,541,842 * 7/1996 Gioutsos et al. ....................... 701/45
5,542,700 * 8/1996 Shibata et al. ......................... 701/46
5,742,916 * 4/1998 Bischoff et al. ....................... 701/45
5,802,480 * 9/1998 Shiraishi ................................ 701/45
5,897,599 * 4/1999 Takeuchi ............................... 701/46
5,914,653 * 6/1999 Takeuchi et al. .................... 340/436
5,999,871 * 12/1999 Liu ........................................ 701/45

* cited by examiner

Primary Examiner—Jacques H. Louis-Jacques
(74) Attorney, Agent, or Firm—Wenderoth, Lind & Ponack, LLP.

(57) ABSTRACT

If an impact acceleration $G_t$ in excess of a predetermined value is detected (step 102), a speed integral value $\Delta V$ is calculated (step 110) and a length of a line segment of the impact acceleration with a passage of time is calculated (steps 112, 114). If a rate of an increment of the speed integral value $\Delta V$ to the length of the line segment within a predetermined interval is smaller than a predetermined value R, it is decided that resonance is caused. Then, it is decided (step 122) whether or not the speed integral value $\Delta V_t$ exceeds a new threshold value which is set on the more negative side from a threshold value $\Delta V_{TH}$ which is defined by V(G), by a predetermined value $\alpha$ (step 120). If it is decided that the speed integral value $\Delta V_t$ exceeds the new threshold value, an inflation of an air bag is carried out (step 124).

9 Claims, 6 Drawing Sheets

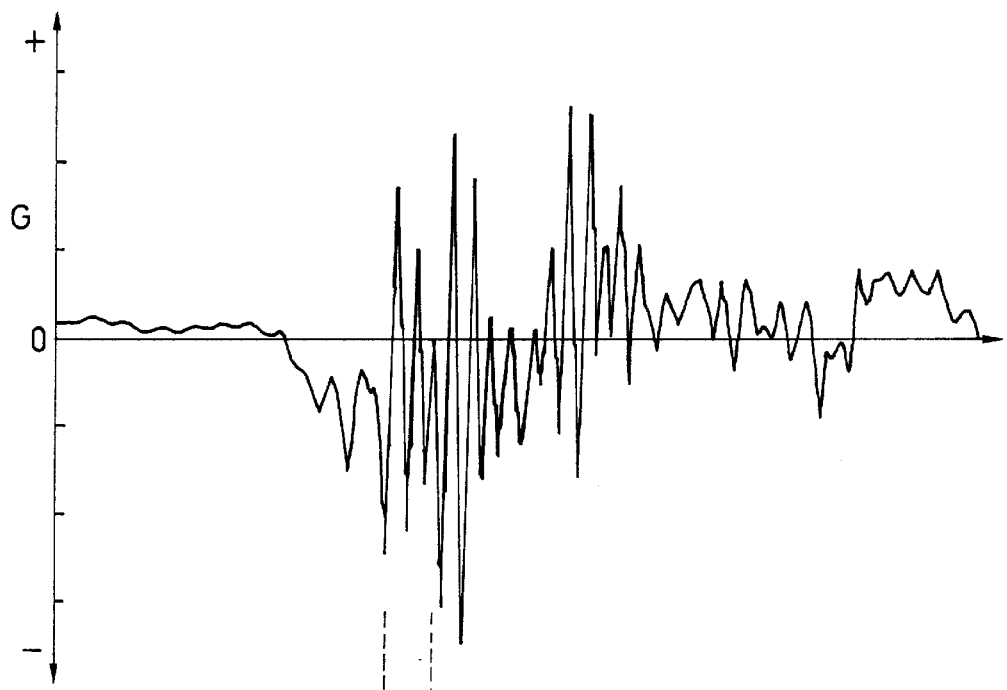
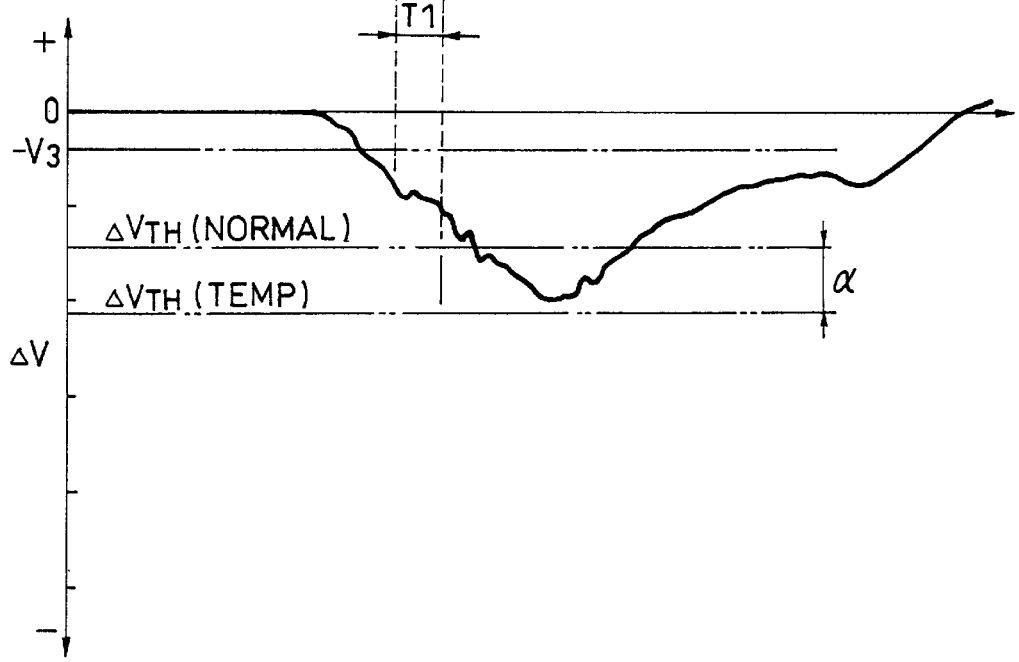

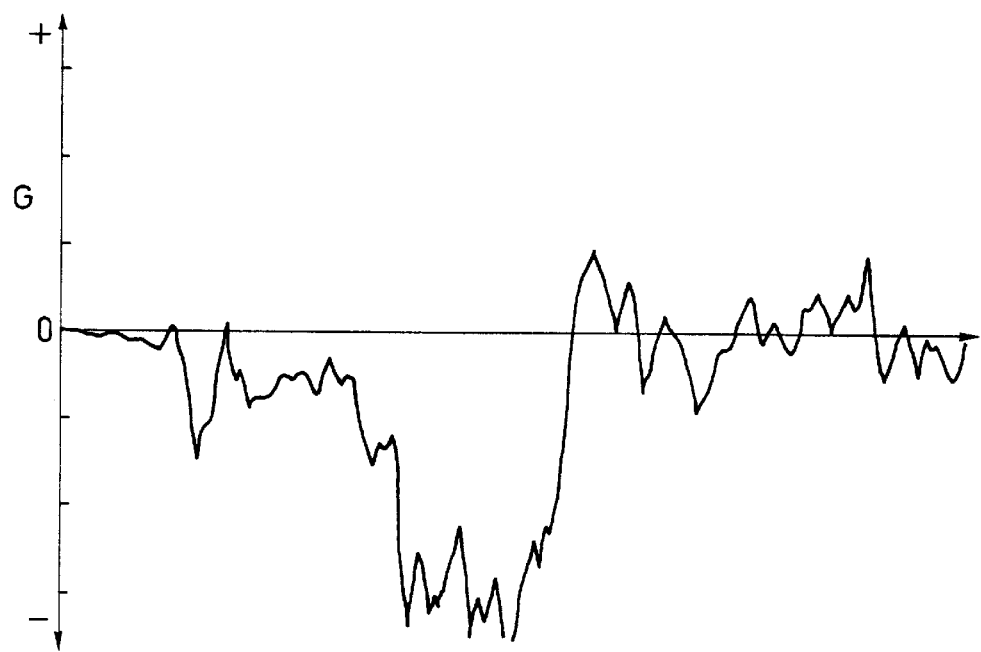
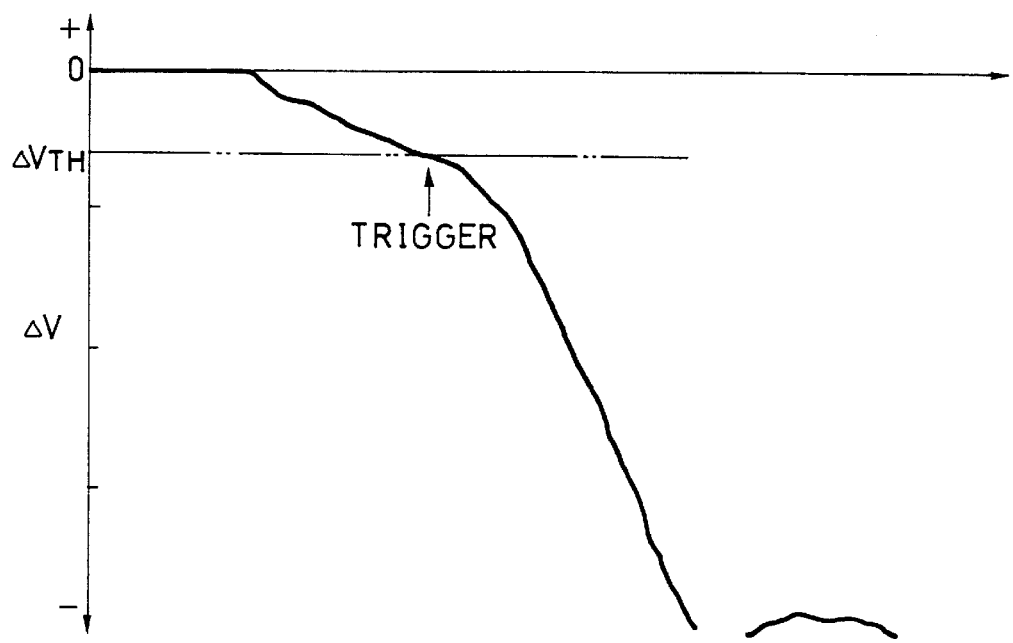

START CONTROLLING METHOD FOR A PASSENGER PROTECTION SYSTEM, AND START CONTROLLING SYSTEM FOR A PASSENGER PROTECTION SYSTEM, AND RECORDING MEDIUM FOR RECORDING START CONTROL PROGRAM FOR PASSENGER PROTECTION SYSTEM

BACKGROUND OF THE INVENTION

1. Field of the Invention

The present invention relates to a start control for a passenger protection system which can achieve protection of the passenger at the time of a vehicle crash and, more particularly, a start control for a passenger protection system which can achieve improvement in the certainty of the crash detection.

2. Description of the Related Art

As the start controlling system for the passenger protection system which is represented by the so-called air bag system, there is the start controlling system disclosed in, for example, Patent Application Publication (KOKAI) Hei 8-310339, etc.

In such start controlling system for the passenger protection system, for example, the accelerator sensor, the CPU for executing the start program, the interface circuit, etc. are incorporated in a housing as one unit which is normally called an "ECU (Electronic Control Unit)". Then, the ECU is placed at a suitable position of a vehicle via a fitting tool, i.e., a fitting bracket.

In the meanwhile, various states exist as the traveling state of the vehicle, and in some cases, so-called underfloor interference may be caused by the vibration state of the vehicle. In such case, there is a possibility that resonance of a fitting bracket for fitting the above ECU is caused. As a result, such vibration may be considered as an acceleration G which is detected by the accelerator sensor as exceeding a predetermined value and thus the passenger protection system is started.

SUMMARY OF THE INVENTION

The present invention has been made in view of the above circumstances, and it is an object of the present invention to provide a start controlling method for a passenger protection system, a start controlling system for the passenger protection system, and a recording medium for recording a start control program for the passenger protection system, which never execute start of the passenger protection system even when resonance of the fitting bracket of ECU due to the underfloor interference, etc. is caused, but execute the start of the passenger protection system without fail only when truly necessary.

It is another object of the present invention to provide a start controlling method for a passenger protection system, a start controlling system for the passenger protection system, and a recording medium for recording a start control program for the passenger protection system, which is able to strictly discriminate a crash from the resonance of the fitting bracket.

According to a first aspect of the present invention, there is provided a start controlling method for a passenger protection system of controlling start of the passenger protection system which is so constructed that a protection system for protecting a passenger in a vehicle can be started in response to a start signal supplied from an external device, the method comprising the steps of:

detecting an acceleration of the vehicle, and then executing time integral of a succeedingly detected acceleration for a predetermined time if the acceleration in excess of a predetermined value is detected;

calculating a length of a line segment of the acceleration detected for the predetermined time with a passage of time;

calculating a rate of an increment of time integral to a calculated length of the line segment for the predetermined time; and deciding generation of a resonance if a calculated rate is below a predetermined value.

Such a method has been made in view of the fact that a magnitude of the acceleration which is detected when resonance of the fitting bracket for fitting the start control system onto a body of the vehicle cannot be discriminated from that of the acceleration caused in the crash of the vehicle. However, the acceleration due to the resonance vibrates in a short time in both the positive direction and the negative direction and the speed integral value which is time integral of such acceleration never has extreme variations, as opposed to the case of the crash.

The length of a line segment of the acceleration generated when the resonance of the fitting bracket with the passage of time becomes longer than that of a line segment of the acceleration in the crash. In the present invention, from a viewpoint of ensuring the certainty of decision, the rate of the increment of the speed integral value to the length of the line segment of the acceleration for the passage of time is calculated, so that it is decided whether or not the resonance is the cause.

Accordingly, it is possible to strictly discriminate the crash from the resonance, and to achieve improvement in the reliability by applying the present invention to the existing start control method.

Especially, since the threshold value serving as a reference to decide whether or not the passenger protection system is started is changed to avoid the start of the passenger protection system if it is decided that the resonance is the cause, the start of the passenger protection system due to resonance can be avoided without fail.

According to a second aspect of the present invention, there is provided a start controlling system for a passenger protection system for controlling start of the passenger protection system which is so constructed that a protection system for protecting a passenger in a vehicle can be started in response to a start signal supplied from an external device, the system comprising:

an acceleration deciding means for deciding whether or not an acceleration of the vehicle input from the external device exceeds a predetermined magnitude;

a speed integral value calculating means for calculating a speed integral value by executing time integral of a succeedingly detected acceleration for a predetermined time if it is decided by the acceleration deciding means that the acceleration in excess of the predetermined magnitude is detected;

a line segment length calculating means for calculating a length of a line segment of the acceleration detected for the predetermined time with a passage of time;

a rate deciding means for calculating a rate of an increment of time integral to a calculated length of the line segment for the predetermined time, to decide whether or not a calculated value is smaller than a predetermined value;

a threshold value calculating means for calculating a threshold value serving as a reference to decide whether or not the passenger protection system is started, based on the acceleration of the vehicle input from the external device;

a threshold value changing means for changing the threshold value being calculated by the threshold value calculating means not to start the passenger protection system if it is decided by the rate deciding means that the calculated value is smaller than the predetermined value; and a start signal deciding/generating means for deciding whether or not the speed integral value calculated by the speed integral value calculating means exceeds the threshold value changed by the threshold value changing means if it is decided by the rate deciding means that the rate is smaller than the predetermined value, then deciding whether or not the speed integral value calculated by the speed integral value calculating means exceeds the threshold value calculated by the threshold value calculating means if it is decided by the rate deciding means that the rate is larger than the predetermined value, and then generating a start signal of the passenger protection system if it is decided in either case that the speed integral value exceeds the threshold value.

Such configuration is fitted particularly to execute the start control method set forth below, and respective means can be implemented by causing a CPU to execute predetermined software, for example.

Here, for example, preferably the threshold value changing means is constructed to set a new threshold value on the more negative side by subtracting the predetermined value from the threshold value if the threshold value defined by the predetermined relation according to the acceleration is set to have the negative value, otherwise preferably the threshold value changing means is constructed to set a new threshold value on the more positive side by adding the predetermined value to the threshold value if the threshold value defined by the predetermined relation according to the acceleration is set to have the positive value. In addition, preferably the threshold value changing means may be constructed to change an amount of subtraction or addition according to the rate of the increment of the speed integral value for the predetermined time to the length of the line segment calculated by the rate deciding means, in place of setting the calculation result as the new threshold value by subtracting the predetermined value from or adding the predetermined value to the threshold value which is defined by the predetermined relation according to the acceleration, as described above.

As the preferable embodiment of the present invention, there is provided a start controlling system for a passenger protection system for controlling start of the passenger protection system which is so constructed that a protection system for protecting a passenger in a vehicle can be started in response to a start signal supplied from an external device, the system comprising:

a microcomputer for executing predetermined processes by reading a predetermined program from an external device and executing the predetermined program;

a memory device for storing the predetermined program executed by the microcomputer to be read by the microcomputer;

a digital/analogue converter for converting a digital start signal to be supplied from the microcomputer to an air bag system into an analogue signal; and an interface circuit for converting an output signal of the digital/analogue converter into a predetermined signal suitable for the air bag system;

wherein the microcomputer decides whether or not an acceleration of the vehicle input from the external device exceeds a predetermined magnitude, and then calculates a speed integral value by executing time integral of a succeedingly detected acceleration for a predetermined time if it is decided that the acceleration exceeds the predetermined magnitude, calculates a length of a line segment of the acceleration detected for the predetermined time with a passage of time, then calculates a rate of an increment of a speed integral value to a calculated length of the line segment for the predetermined time, and then decides whether or not the rate of the increment of the speed integral value to the length of the line segment for the predetermined time is smaller than a predetermined value, calculates a threshold value serving as a reference to decide whether or not the passenger protection system is started, based on the acceleration of the vehicle input from the external device, performs first decision processing, when the rate of the increment of the speed integral value to the length of the line segment for the predetermined time is decided to be smaller than the predetermined value, in order to change the calculated threshold value in a direction for preventing start of the passenger protection system and to decide whether or not the calculated speed integral value exceeds the changed threshold value, performs second decision processing, when the rate of the increment of the speed integral value to the length of the line segment for the predetermined time is decided to be larger than the predetermined value, in order to decide whether or not the calculated speed interval value exceeds the threshold value before the change, and outputs a signal for starting the passenger protection system if it is decided in the first decision processing that the calculated speed integral value has exceeded the changed threshold value or it is decided in the second decision processing that the calculated speed integral value has exceeded the threshold value before the change.

According to a third aspect of the present invention, there is provided a start controlling system for a passenger protection system for controlling start of the passenger protection system which is so constructed that a protection system for protecting a passenger in a vehicle can be started in response to a start signal supplied from an external device, the system comprising:

an acceleration deciding means for deciding whether or not an acceleration of the vehicle input from the external device exceeds a predetermined magnitude;

a speed integral value calculating means for calculating a speed integral value by executing time integral of a succeedingly detected acceleration for a predetermined time if it is decided by the acceleration deciding means that the acceleration in excess of the predetermined magnitude is detected;

a line segment length calculating means for calculating a length of a line segment of the acceleration detected for the predetermined time with a passage of time;

a rate deciding means for calculating a rate of an increment of a speed integral value to a calculated length of the line segment for the predetermined time, to decide whether or not a calculated value is smaller than a predetermined value;

a speed integral value changing means for changing the speed integral value being calculated by the speed integral value calculating means to reduce its absolute value if it is decided by the rate deciding means that the rate is smaller than the predetermined value;

a threshold value calculating means for calculating a threshold value serving as a reference to decide whether or not the passenger protection system is started, based on the acceleration of the vehicle input from the external device after it is decided by the rate deciding means that the rate is not smaller than the predetermined value or after the speed integral value is changed by the speed integral value changing means; and a start signal deciding/generating means for deciding whether or not the speed integral value exceeds the threshold value calculated by the threshold value calculating means, and then generating a start signal of the passenger protection system if it is decided that the speed integral value exceeds the threshold value.

The start controlling system for the passenger protection system according to the above second aspect of the present invention is constructed to change the threshold value, whereas such configuration according to the third aspect of the present invention provides the speed integral value changing means for changing the speed integral value to avoid the start of the passenger protection system. Therefore, like the above second aspect of the present invention, it is possible to avoid a possibility of start of the passenger protection system caused by the resonance without fail.

Here, preferably the speed integral value changing means is constructed to set a new speed integral value on the more positive side by adding the predetermined positive value to the speed integral value if the speed integral value is set to have the negative value, otherwise preferably the speed integral value changing means is constructed to set a new speed integral value on the more negative side by subtracting the predetermined negative value from the speed integral value if the speed integral value is set to have the positive value. In addition, preferably the threshold value changing means may be constructed to change an amount of subtraction or addition according to the rate of the increment of the speed integral value for the predetermined time to the length of the line segment calculated by the rate deciding means, in place of setting the calculation result as the new speed integral value by subtracting the predetermined value from or adding the predetermined value to the speed integral value, as described above.

As the preferable embodiment of the present invention, there is provided a start controlling system for a passenger protection system for controlling start of the passenger protection system which is so constructed that a protection system for protecting a passenger in a vehicle can be started in response to a start signal supplied from an external device, the system comprising:

a microcomputer for executing predetermined processes by reading a predetermined program from an external device and executing the predetermined program;

a memory device for storing the predetermined program executed by the microcomputer to be read by the microcomputer;

a digital/analogue converter for converting a digital start signal to be supplied from the microcomputer to an air bag system into an analogue signal; and an interface circuit for converting an output signal of the digital/analogue converter into a predetermined signal suitable for the air bag system;

wherein the microcomputer decides whether or not an acceleration of the vehicle input from the external device exceeds a predetermined magnitude, and then calculates a speed integral value by executing time integral of a suc-ceedingly detected acceleration for a predetermined time if it is decided that the acceleration exceeds the predetermined magnitude, calculates a length of a line segment of the acceleration detected for the predetermined time with a passage of time, then calculates a rate of an increment of a speed integral value to a calculated length of the line segment for the predetermined time, and then decides whether or not the rate of the increment of the speed integral value to the length of the line segment for the predetermined time is smaller than a predetermined value, changes the calculated speed integral value to reduce its absolute value if it is decided that the rate of the increment of the speed integral value to the length of the line segment for the predetermined time is smaller than the predetermined value, calculates a threshold value serving as a reference to decide whether or not the passenger protection system is started, based on the acceleration of the vehicle input from the external device, after the speed integral value is changed or after it is decided that the rate of the increment of the speed integral value to the length of the line segment for the predetermined time is not smaller than the predetermined value, then decides whether or not the changed speed integral value exceeds the calculated threshold value, and then generates a start signal of the passenger protection system if it is decided that the speed integral value exceeds the threshold value.

According to a fourth aspect of the present invention, there is provided a recording medium for recording a plurality of computer-readable instructions, comprising:

a first instruction means for causing a computer to decide whether or not an acceleration of a vehicle input from an external device exceeds a predetermined value;

a second instruction means for causing the computer to execute time integral of a succeedingly input acceleration for a predetermined time if it is decided that the acceleration of the vehicle input from the external device exceeds the predetermined value;

a third instruction means for causing the computer to calculate a length of a line segment of a succeedingly input acceleration for the predetermined time with a passage of time if it is decided that the acceleration of the vehicle input from the external device exceeds the predetermined value;

a fourth instruction means for causing the computer to calculate a rate of an increment of time integral to a calculated length of the line segment for the predetermined time;

a fifth instruction means for causing the computer to decide whether or not a calculated value is below a predetermined value;

a sixth instruction means for deciding generation of a resonance if it is decided as a result of decision that the calculated value is below the predetermined value, and then causing the computer to calculate a threshold value serving as a reference to decide whether or not the passenger protection system is started, according to a predetermined relation based on the input acceleration;

a seventh instruction means for causing the computer to change the calculated threshold value such that start of the passenger protection system can be avoided;

an eighth instruction means for causing the computer to decide whether or not the calculated speed integral value exceeds the changed threshold value;

a ninth instruction means for causing the computer to generate a start signal of the passenger protection system if it is decided that the calculated speed integral value exceeds the changed threshold value;

a tenth instruction means for causing the computer to decide whether or not the speed integral value exceeds a threshold value, which is calculated according to the predetermined relation based on the input acceleration and serves as the reference to decide whether or not the passenger protection system is started, if it is decided that the rate of the increment of time integral to the calculated length of the line segment for the predetermined time is not below the predetermined value; and an eleventh instruction means for causing the computer to generate a start signal of the passenger protection system if it is decided that the speed integral value exceeds the threshold value which is calculated according to the predetermined relation based on the input acceleration and serves as the reference to decide whether or not the passenger protection system is started.

According to a fifth aspect of the present invention, there is provided a recording medium for recording a plurality of computer-readable instructions, comprising:

According to a fifth aspect of the present invention, there is provided a recording medium for recording a plurality of computer—readable instructions, comprising:

a first instruction means for causing a computer to decide whether or not an acceleration of a vehicle input from an external device exceeds a predetermined value;

a second instruction means for causing the computer to execute time integral of a succeedingly input acceleration for a predetermined time if it is decided that the acceleration of the vehicle input from the external device exceeds the predetermined value;

a third instruction means for causing the computer to calculate a length of a line segment of a succeedingly input acceleration for the predetermined time with a passage of time if it is decided that the acceleration of the vehicle input from the external device exceeds the predetermined value;

a fourth instruction means for causing the computer to calculate a rate of an increment of time integral to a calculated length of the line segment for the predetermined time;

a fifth instruction means for causing the computer to decide whether or not the rate of the increment of time integral to the calculated length of the line segment for the predetermined time is below the predetermined value;

a sixth instruction means for deciding generation of a resonance if it is decided as a result of decision that the rate of the increment of time integral to the calculated length of the line segment for the predetermined time is below the predetermined value, and then causing the computer to change the speed integral value such that start of the passenger protection system can be avoided;

a seventh instruction means for causing the computer to decide whether or not the changed speed integral value exceeds a threshold value which is calculated according to a predetermined relation based on the input acceleration and serves as a reference to decide whether or not the passenger protection system is started;

an eighth instruction means for causing the computer to generate a start signal of the passenger protection system if it is decided that the changed speed integral value exceeds the threshold value;

a ninth instruction means for causing the computer to decide whether or not the speed integral value exceeds the threshold value, which is calculated according to the predetermined relation based on the input acceleration and serves as the reference to decide whether or not the passenger protection system is started, if it is decided that the rate of the increment of time integral to the calculated length of the line segment for the predetermined time is not below the predetermined value; and a tenth instruction means for causing the computer to generate a start signal of the passenger protection system if it is decided by the ninth instruction means that the speed integral value exceeds the threshold value.

BRIEF DESCRIPTION OF THE DRAWINGS

FIGS. 3A and 3B are characteristic diagrams showing examples of change in impact acceleration and speed integral value when resonance of a fitting bracket is caused, wherein FIG. 3A is a characteristic diagram showing the characteristic of change in the impact acceleration and FIG. 3B is a characteristic diagram showing the characteristic of change in the speed integral value;

FIGS. 4A and 4B are characteristic diagrams showing examples of change in impact acceleration and speed integral value in a middle speed crash, wherein FIG. 4A is a characteristic diagram showing the characteristic of change in the impact acceleration and FIG. 4B is a characteristic diagram showing the characteristic of change in the speed integral value;

DETAILED DESCRIPTION OF THE PREFERRED EMBODIMENTS

An embodiment of the present invention will be explained in detail with reference to the accompanying drawings hereinafter.

In this disclosure, members, arrangement, etc. to be explained in the following should not be interpreted to limit the present invention, and they can be varied variously within the range of gist of the present invention.

First, a basic configuration of a start controlling system for a passenger protection system (referred to as a "present system" hereinafter) according to an embodiment of the present invention will be explained with reference to FIG. 1 hereunder.

Figure 1:
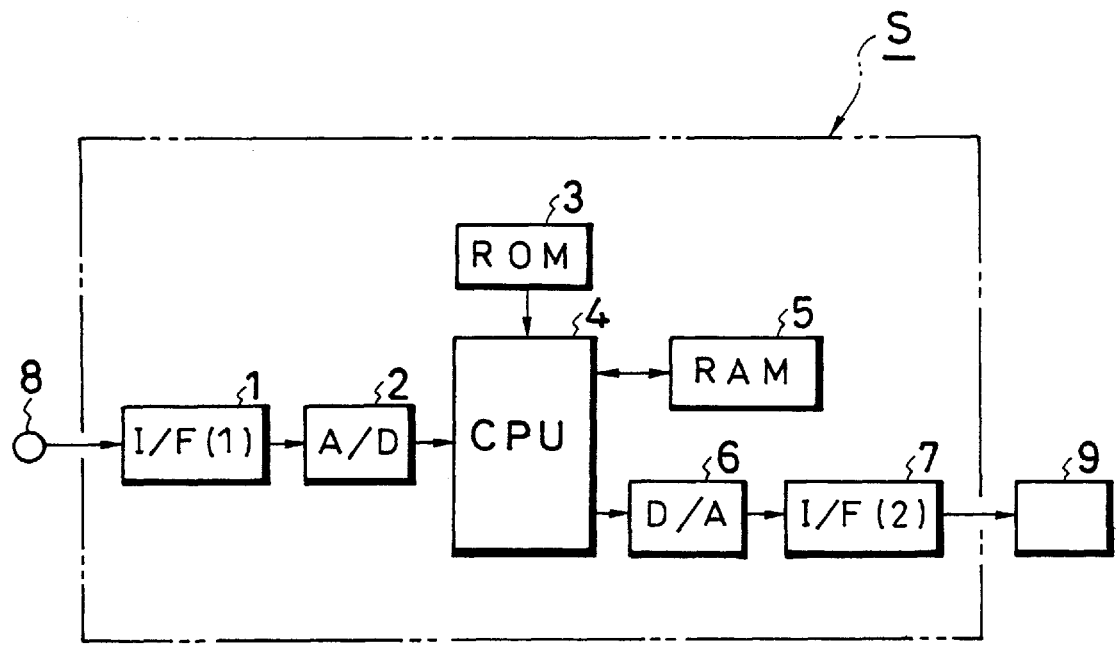
FIG. 1 is a view showing an example of a configuration of a start controlling system for a passenger protection system according to an embodiment of the present invention.

So-called hardware of the present system S comprises a first interface circuit (labeled as "I/F(1)" in FIG. 1) 1, an analogue/digital converter (labeled as "A/D" in FIG. 1) 2 for converting an analogue signal into a digital signal, a ROM (Read Only Memory) 3, a CPU (Central Processing Unit) 4, a RAM (Random Access Memory) 5, a digital/analogue converter (labeled as "D/A" in FIG. 1) 6 for converting a digital signal into an analogue signal, and a second interface circuit (labeled as "I/F (2)" in FIG. 1) 7. As described later, the present system S is constructed to control start of an air bag system 9 serving as the passenger protection system, based on the so-called impact acceleration detected by an acceleration sensor 8 at the time of the vehicle crash.

The first interface circuit 1 converts a level of the signal being input from an acceleration sensor 8. An output signal of the first interface circuit 1 is them converted into a digital signal by the analogue/digital converter 2 and then input into the CPU 4.

The ROM 3 is the well known data read only memory device which is fabricated as the so-called IC. The program, constants, etc. for implementing a start controlling operation described later are stored previously in the ROM 3.

The CPU 4 has a function as the so-called well known microcomputer which is fabricated as the so-called IC. The CPU 4 executes operation control of the present system S as described later. In this case, as an integrated circuit which enables high speed arithmetic process, the well known DSP (Digital Signal Processor) may be employed in place of the CPU 4.

The RAM 5 is the well known memory device which is fabricated as the so-called IC to read and write the arithmetic results, etc. by the CPU 4.

The second interface circuit 7 provides a so-called interface between the present system S and the air bag system 9. More particularly, a digital start signal being output from the CPU 4 is converted into an analogue signal by the digital/analogue converter 6 and then input into this second interface circuit 7. At that time, the second interface circuit 7 converts a signal level of the analogue signal into a level which is fitted for the air bag system 9, etc., and then outputs the analogue signal to the air bag system 9.

As the typical acceleration sensor, there are a semiconductor sensor, a piezoelectric sensor, etc. There is no necessity that the acceleration sensor 8 of the present system S should be limited to a particular type. Any type of the acceleration sensor may be employed as the acceleration sensor 8 of the present system S.

The air bag system 9 consists of an inflator (gas generator) (not shown) and an air bag main body (not shown). As well known publicly, when the start signal is input into the air bag system 9 from the present system S, the inflator generates the gas to inflate the air bag main body.

Next, procedures of particular start control carried out by the CPU 4 will be explained with reference to FIG. 2 hereunder.

Figure 2:
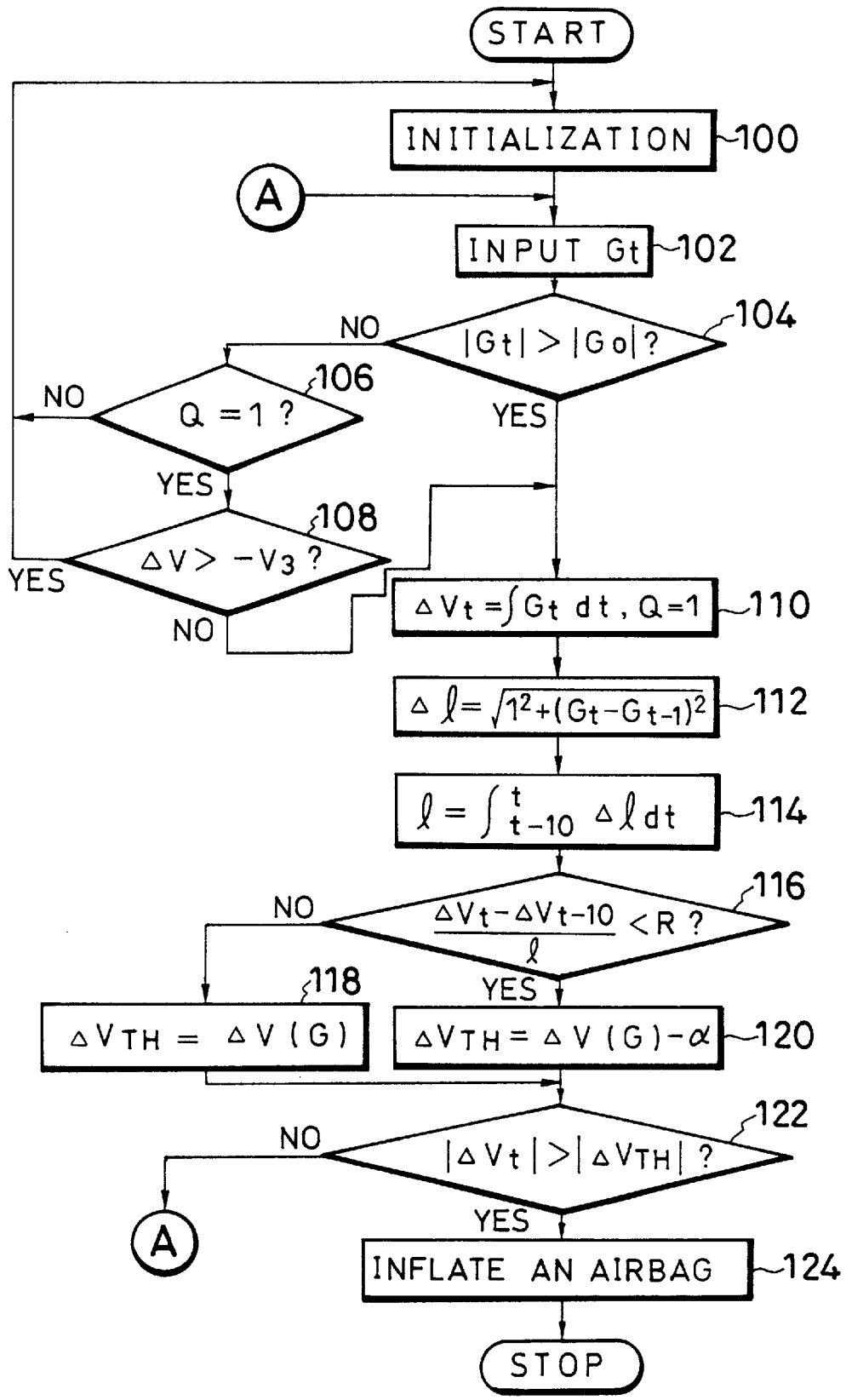
FIG. 2 is a flowchart illustrating procedures of start control carried out by the start controlling system for the passenger protection system shown in FIG. 1.

To begin with, when an operation of the CPU 4 is started, initialization of various variables, flags, etc. is performed (see step 100 in FIG.2). For example, though described later in detail, a flag Q, a speed integral value $\Delta V$, a length l of a line segment, etc. are initialized to zero respectively.

Then, an impact acceleration $G_t$ which is detected by the acceleration sensor 8 at a time t is input (see step 102 in FIG. 2). Then, it is decided whether or not an absolute value of the impact acceleration $G_t$ exceeds an absolute value of a predetermined impact acceleration $G_D$ (see step 104 in FIG. 2).

In this case, the predetermined impact acceleration $G_O$ is set to a value of the impact acceleration which is not generated in the normal traveling state of the vehicle. For example, the predetermined impact acceleration $G_O$ is decided by adding various empirical conditions to experimental data. It is possible that this impact acceleration is generated in both the positive polarity side and the negative polarity side respectively. For example, an example of the characteristic of change in the impact acceleration in a middle speed crash is shown in FIG. 4A. In the case of such vehicle crash, since the impact acceleration is generated in the deceleration state, the absolute value of the impact acceleration is increased mainly on the negative polarity side, nevertheless the impact acceleration appears to have a slight magnitude like so-called overshoot on the positive polarity side.

In contrast, an example of the characteristic of change in the impact acceleration, which is generated due to so-called underfloor interference and then detected when resonance of a fitting bracket (not shown) of the present system S is caused, is shown in FIG. 3A. In other words, it can be seen according to this example that, when the underfloor interference is caused or when the resonance of the fitting bracket is caused due to the underfloor interference, the detected impact acceleration appears to have the substantially same magnitude on both the positive polarity side and the negative polarity side, especially at the time of start of the resonance.

Therefore, in the step of deciding the magnitude of the impact acceleration in step 104, if the predetermined impact acceleration $G_0$ is set to a negative value, the same value can be applied in decision irrespective of the actual crash, the underfloor interference as mentioned above, and the resonance of the fitting bracket due to the underfloor interference. As a result, it is preferable to employ the negative value in decision in step 104.

Then, in the decision in step 104, if it has been decided that the absolute value of the impact acceleration $G_t$ detected at a time t exceeds the absolute value of the predetermined impact acceleration $G_o$, in other words, if it has been decided that the impact acceleration G, has the more negative value than the predetermined impact acceleration $G_o$ (i.e., the state in which the deceleration is larger) (if YES in step 104), the process goes to step 110 to be described later. On the contrary, if it has been decided that the absolute value of the impact acceleration $G_t$ does not exceed the absolute value of the predetermined impact acceleration $G_o$ (if NO in step 104), the process advances to step 106 where it is decided whether or not the flag Q is equal to "1" (see step 106 in FIG. 2).

The flag Q is employed to decide whether or not integral process described later (see step 110 in FIG.2) has been started. If the integral process has been started, the flag Q is set to "1" Then, in step 106, if it has been decided that the flag $Q \neq 1$ (if NO in step 106), the absolute value of the impact acceleration $G_t$ has never exceeded the absolute value of the predetermined impact acceleration $G_o$ yet and the integral process described later (see step 110 in FIG. 2) has not been started yet. This situation means that there is no necessity to carry out succeeding processes, and thus the process returns to previous step 100. Then, the processes are repeated again from the beginning.

In contrast, if it has been decided that the flag Q=1 (if YES in step 106), under the condition that the integral process has already started, the absolute value of the impact acceleration $G_t$ has exceeded once the absolute value of the predetermined impact acceleration $G_o$ and then such absolute value of the impact acceleration $G_t$ has been less than the absolute value of the predetermined impact acceleration $G_o$ again. Therefore, in order to decide whether or not the process must be still continued, it is decided whether or not the speed integral value $\Delta V$, which is a time integral value of the impact acceleration which has already calculated at this point of time, exceeds a predetermined value "$-V3$" (see step 108 in FIG. 2).

In this case, the predetermined value "$-V3$" is set to such an extent that it enables a decision that the vehicle is not in the state to start its air bag, system 9 but the vehicle can travel without trouble. Such predetermined value "$-V3$" is set experimentally or is set by adding various conditions to the experimental data, and others. For example, the characteristic of change in the impact acceleration when the resonance of the fitting, bracket is caused is shown in FIG. 3A, and the characteristic of change in the speed integral value $\Delta V$ which is the time integral value of the impact acceleration shown in FIG. 3A is shown in FIG. 3B. In FIG. 3B, as described later, $\Delta V_{TH\ (NORMAL)}$ denotes a reference value used to decide that the vehicle crash is caused in this start control, and the predetermined value "–V3" is set to a smaller level than the reference value (that is, the level which is closer to the positive value).

Then, if it has been decided that the speed integral value $\Delta V$ is larger than the predetermined value "–V3" (if YES in step 108), neither the crash nor the resonance of the fitting bracket has occurred and thus there is no need for a series of succeeding processes are carried out. Therefore, the process returns to previous step 100 and then the processes are repeated again from the beginning.

On the other hand, if it has been decided that the speed integral value $\Delta V$ is not larger than the predetermined value "–V3" (if NO in step 108), in other words, if it has been decided that the speed integral value $\Delta V$ is a value located on the more negative side than the predetermined value "–V3", there is such a possibility that the crash or the resonance of the fitting bracket is caused. As a result, the integral process is carried out (see step 110 in FIG. 2).

More particularly, the flag Q is set to "1" and the speed integral value $\Delta V$ is also calculated by integrating the impact acceleration $G_t$, which is input at a predetermined time interval, with respect to time (see step 110 in FIG. 2).

Then, an infinitesimal length $\Delta l$ of the line segment of the impact acceleration $G_t$ per unit time is calculated (see step 112 in FIG. 2). In other words, the infinitesimal length $\Delta l$ of the line segment can be calculated as $\Delta l = \{1+(G_t-G_{(t-1)})^2\}^{1/2}$. Where $G_t$ is the impact acceleration at a time t, and G (t–1) is the impact acceleration at a time prior to the time t by a unit time (actually a time corresponding to one clock for the CPU 4, for example). Under the assumption that a time interval between $G_t$ and $G_{(t-1)}$ can be considered sufficiently small and thus be approximated to "1" and that the rectangular triangle which consists of difference between $G_t$ and $G_{(t-1)}$ and the time interval 1 as two orthogonal sides can be formed, this equation calculates the oblique side of this rectangular triangle.

Then, if the infinitesimal length $\Delta l$ of the line segment being calculated as described above is integrated relative to time within a predetermined interval T1 (see FIG. 3B), e.g., within about 10 msec, the length l of the line segment of the impact acceleration within the predetermined interval can be calculated (see step 114 in FIG. 2).

Next, it is decided whether or not a rate of change in the impact acceleration within the predetermined interval against the length l of the line segment in the predetermined interval calculated as set forth above is smaller than a predetermined value R (see step 116 in FIG. 2). In other words, if the predetermined interval employed to calculate the length l of the line segment is selected as 10 msec, as described above, it is decided whether or not a value which is obtained by dividing an increment amount $\Delta V_t - \Delta V_{(t-10)}$ of the speed integral value within the interval of 10 msec by the previously calculated length l of the line segment is smaller than the predetermined value R.

This decision is conducted based on reasons given in the following.

At first, both the impact acceleration caused when the vehicle crash occurs and the impact acceleration caused by the resonance of the fitting bracket due to the underfloor interference, etc. occasionally have almost the same magnitude. Therefore, in the prior art, it has been well known that both conditions cannot be discriminated based on the magnitude of the impact acceleration only.

However, like the example shown in FIG. 3A, for example, the change in the impact acceleration detected when the resonance of the fitting bracket occurs exhibits a feature of positive and negative vibrations in a short period, especially in the initial stage, in contrast to the change in the impact acceleration detected when the crash occurs (e.g., see the example of the characteristic of change in the impact acceleration in the middle speed crash, as shown in FIG. 4A). On the contrary, the impact acceleration caused by the resonance as discussed above can also vibrate in a short period in both the positive and negative polarity directions, but the time integral value of such impact acceleration is never extremely changed in comparison with the time integral of the impact acceleration caused in the case of the crash (see FIG.3B and FIG. 4B).

As a result, an increment rate of the speed integral value relative to the length of the line segment within the predetermined range of the impact acceleration is different according to the crash case or the resonance case. The present invention has been made in light of such difference, and can strictly discriminate the vehicle crash from the resonance of the fitting bracket by comparing their increment rates of the speed integral value relative to the length of the line segment of the impact acceleration within such predetermined range, whereby start of the passenger protection system in the case of resonance can be prevented.

Here, returning to the previous explanation of FIG. 2, in the decision in step 116, if it has been decided that a rate of the increment amount $\Delta V_t - \Delta V_{(t-10)}$ of the speed integral value $\Delta V$ against the length l of the line segment is smaller than the predetermined value R (if YES in step 116), it is then decided that the resonance of the fitting bracket (not shown) is caused and then a threshold value $\Delta V_{TH}$ is changed to avoid the start of the air bag system 9 (see step 120 in FIG. 2). More particularly, the threshold value $\Delta V_{TH}$ is a reference value to decide whether or not the speed integral value $\Delta V$ reaches the magnitude at which the air bag system 9 must be started. Normally the threshold value $\Delta V_{TH}$ can be calculated based on the magnitude of the impact acceleration at a time of decision by using a predetermined relation (V(G) in step 120 means this predetermined relation), otherwise the threshold value $\Delta V_{TH}$ can be set based on a transformation table in which relationships between the impact accelerations G and the threshold values $\Delta V_{TH}$ are stipulated and previously stored.

In step 120, a value obtained by subtracting a predetermined value $\alpha$ from the normal threshold value which is decided in response to the impact accelerations G in this way, for convenience, say this threshold value is assumed temporarily as $\Delta V_{TH(NORMAL)}$, is set as the threshold value $\Delta_{VTH(TEMP)}$ at this time. This is because, when the resonance of the fitting bracket is caused, the situation that the speed integral value $\Delta V$ never exceeds the threshold value can be assured by changing the threshold value like the above to thus avoid the start of the air bag system 9 (see FIG. 3B)

The detailed explanation of the concrete relation between the impact accelerations G and the threshold value $\Delta V_{TH}$ will be omitted in this disclosure. Roughly speaking, the relationships between them can be stipulated in this relation, for example, by deriving a level of the impact accelerations G to start the air bag system 9 in the middle speed frontal crash based on experimental data or simulation data being calculated by the computer and also deriving the speed integral value at that time. In addition, by taking into account the difference in the generation of the impact accelerations G according to the type of the vehicle, suitable relations can be set for every type of vehicle.

In this example, in response to the situation that the speed integral value ΔV is set to take the negative value, the speed integral value ΔV obtained when the resonance is caused is set not to exceed the threshold value by subtracting the predetermined value a. However, if the speed integral value ΔV is set to take the positive value, the speed integral value ΔV obtained when the resonance is caused may be set not to exceed the threshold value by adding the predetermined value α.

In contrast, in step 116, if it has been decided that the rate of the increment amount $\Delta V_t - \Delta V_{(t-10)}$ of the speed integral value ΔV against the length l of the line segment is not smaller than the predetermined value R (if NO in step 116), the threshold value $\Delta V_{TH}$ corresponding to the magnitude of the impact accelerations G can be set based on the predetermined relations, as described above, since the resonance of the fitting bracket is not caused (see step 118 in FIG. 2).

Then, after the process in any one of step 120 and step 118 mentioned above has been performed, it is decided whether or not the speed integral value ΔV at this time exceeds the threshold value $\Delta V_{TH}$, i.e., whether or not the absolute value of the speed integral value $\Delta V_t$ is increased larger than the threshold value $\Delta V_{TH}$ (see step 122 in FIG. 2).

In step 122, if it has been decided that the speed integral value $\Delta V_t$ exceeds the threshold value $\Delta V_{TH}$ (if YES in step 122), i.e., if it has been decided that the speed integral value ΔV exceeds the threshold value $\Delta V_{TH}$ being set in the more negative side to thus take a more negative value under the condition that the speed integral value ΔV is set in the negative region as shown in FIG. 3B, a start signal is output from the CPU 4 to the air bag system 9 via the digital/analogue converter 6 and the second interface circuit 7 to inflate the air bag since the start of the air bag system 9 is needed (see step 124 in FIG. 2).

Meanwhile, in step 122, if it has been decided that the speed integral value $\Delta V_t$ does not exceed the threshold value $\Delta V_{TH}$ (if NO in step 122), i.e., if the speed integral value $\Delta V_t$ has a value still closer to the positive side than the threshold value $\Delta V_{TH}$, the process returns to above step 102 since the air bag system 9 should not be inflated, and then a series of processes are continued repetitively (see step 122 in FIG.2).

In the above example, when the resonance of the fitting bracket is caused, the threshold value can be changed by subtracting the predetermined value a from the normal threshold value which is decided in response to the impact accelerations G. In this case, there is no need that the value α is always set as a fixed value. For instance, a value which corresponds to $(\Delta V_t - \Delta V_{(t-10)})/l$ calculated in step 116 may be used as the value α.

Also, in the above example, in step 116, if it has been decided that the rate of the increment amount $\Delta V_t - \Delta V_{(t-10)}$ of the speed integral value against the length l of the line segment is smaller than the predetermined value R (if YES in step 116), the threshold value is changed (see step 120 in FIG.2). In this case, as disclosed in another example of the start control described hereunder, the speed integral value may be changed.

Another example of the start control will be explained with reference to a flowchart shown in FIG. 5 in the following. Here the same references are attached to steps of executing the same processes as those shown in FIG. 2. In another example of the start control to be explained herein, processing portion for changing the speed integral value is largely different from the start control shown in FIG. 2, but remaining portions are basically similar to those of the start control shown in FIG. 2. Hence, different respects in another example of the start control will be mainly explained in the following. Therefore, a flowchart shown in FIG. 5 will be given as a partial flowchart.

Figure 5:
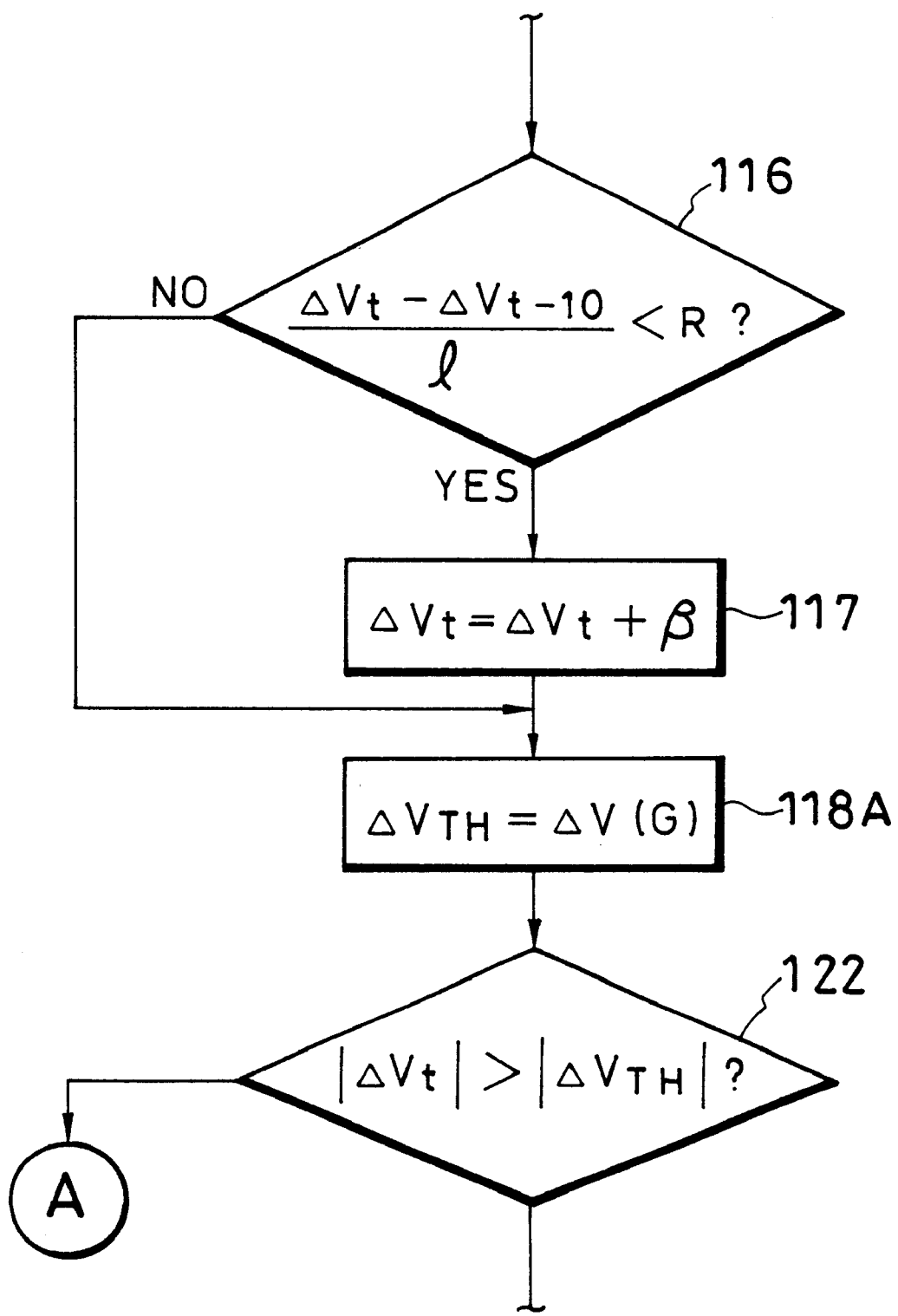
FIG. 5 is a flowchart illustrating procedures of start control in another control example.

First, in step 116, if it has been decided that the rate of the increment amount $\Delta V_t - \Delta V_{(t-10)}$ of the speed integral value ΔV against the length l of the line segment is smaller than the predetermined value R (if YES in step 116), it is then decided that the resonance of the fitting bracket (not shown) is caused and then the speed integral value $\Delta V_t$ at this point of time is changed to avoid the start of the air bag system 9 (see step 117 in FIG. 5). More particularly, if the speed integral value $\Delta V_t$ is set to take the negative value, a predetermined value β is added to the speed integral value $\Delta V_t$, and then such added value is newly set as the speed integral value $\Delta V_t$, so that the speed integral value ΔV can be changed to a value which is hard to exceed the threshold value $\Delta V_{TH}$. In other words, if the speed integral value $\Delta V_t$ has the negative value, the speed integral value ΔV is changed into the more positive side value. If the speed integral value $\Delta V_t$ is set to take the positive value, a predetermined value may be subtracted from the speed integral value $\Delta V_t$ in contrast to the above.

After step 117 has been carried out like the above, the process advances to step 118A.

On the contrary, in step 116, if it has been decided that the rate of the increment amount $\Delta V_t - \Delta V_{(t-10)}$ of the speed integral value ΔV against the length l of the line segment is larger than the predetermined value R (if NO in step 116), the process proceeds to step 118A without the execution of above step 117.

In step 118A, the threshold value $\Delta V_{TH}$ is set based on the predetermined relation as described above. In this case, step 118A is similar to above step 118 in FIG. 2 in that the threshold value $\Delta V_{TH}$ is set by the impact acceleration G based on the predetermined relations. However, above step 118 in FIG. 2 is executed only if the decision in step 116 is NO, whereas this step 118A is executed if the decision in step 116 is NO or after step 117 has been executed. For this reason, this step is labeled as step 118A to distinguish from above step 118 in FIG. 2.

After step 118A has been executed, the process advances to step 122. Then, it is decided whether or not the speed integral value $\Delta V_t$ exceeds the threshold value $\Delta V_{TH}$, i.e., whether or not the absolute value of the speed integral value $\Delta V_t$ is increased larger than the threshold value $A V_{TH}$ (see step 122 in FIG. 2). Then, as explained with reference to FIG. 2 previously, according to the decision result, the start of the air bag system 9 is performed, or the process returns to step 102 (see FIG. 2) to repeat a series of processes.

In this example of the start control, there is no need that the above value β is always set as a fixed value. For example, a value which corresponds to $(\Delta V_t - \Delta V_{(t-10)})/l$ calculated in step 116 may be used as the value β.

In the above explanation, an acceleration deciding means can be implemented by executing step 104 in FIG. 2 with the CPU 4, a speed integral calculating means can be implemented by executing step 110 in FIG. 2 with the CPU 4, a line segment length calculating means can be implemented by executing steps 112, 114 in FIG. 2 with the CPU 4, and a rate deciding means can be implemented by executing step 116 in FIG. 2 with the CPU 4.

Also, a threshold value calculating means can be implemented by executing step 118 in FIG. 2 with the CPU 4, a threshold value changing means can be implemented by executing step 120 in FIG. 2 with the CPU 4, and a start signal deciding means can be implemented by executing steps 122 and 124 in FIG. 2 with the CPU 4.

In addition, a speed integral value changing means can be implemented by executing step 117 in FIG. 5 with the CPU 4, a threshold value calculating means can be implemented by executing step 118A in FIG. 5 with the CPU 4, and a start signal deciding means can be implemented by executing steps 122 and 124 in FIG. 2 with the CPU 4.

In the above explanation, the explanation has been made such that the above start control is executed under the premise that the start control program executed by the CPU 4 is stored previously in the ROM 3. However, there is no necessity that this program is always previously stored. That is, the start control program may be stored in an external storing medium, and then read into the CPU 4 from the external storing medium upon execution of the start control.

In other words, for example, as such external storing medium, there may be considered the so-called magnetic recording medium such as a floppy disk, a hard disk, a magnetic disk, etc., an optical disk, and the like. Of course, it is needless to say that, if such recording medium is employed, a reading device suitable for each medium (e.g., a floppy disk drive, a hard disk drive, etc.) must be provided.

Figure 6:
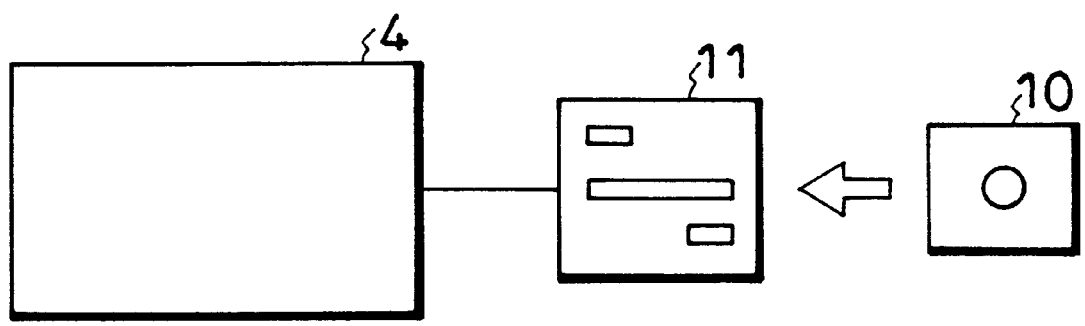
FIG. 6 is a view showing an example of a configuration when a floppy disk is utilized to read a program.

An example of a configuration used when the floppy disk 10 is utilized as a recording medium for the program is shown in FIG. 6. The reading of the program supplied when the floppy disk 10 is employed as the recording medium will be explained with reference to FIG. 6 hereunder.

A floppy disk drive 11 is connected to the CPU 4. The program is recorded in advance in the floppy disk 10. Thus, the program is read out from the floppy disk 10 by operating the floppy disk drive 11, and then loaded into the CPU 4 to enable the execution of the program.

As described above, according to the present invention, since the impact acceleration can be identified by checking the vibration of the impact acceleration caused when the resonance of the fitting bracket for fitting the start control system onto the vehicle is caused due to the underfloor interference, etc., the vehicle crash and the resonance of the fitting bracket can be strictly discriminated from each other.

In particular, when it is decided that the resonance has been generated, either the threshold value itself which is a reference to decide whether or not the passenger protection system should be started or the speed integral value which is compared with the threshold value can be changed. Therefore, in addition to the above advantages, such a possibility can be avoided without fail that the passenger protection system is started during the resonance, and thus reliability of the passenger protection system can be greatly improved.

What is claimed is:

1. A start controlling method for controlling start of a passenger protection system which is so constructed that a protection system for protecting a passenger in a vehicle can be started in response to a start signal, said start controlling method comprising:

detecting an acceleration of the vehicle, and then executing a time integral of a succeedingly detected acceleration for a predetermined time if the acceleration is in excess of a predetermined value;

calculating a length of a line segment of the acceleration succeedingly detected for the predetermined time with a passage of time;

calculating a rate of an increment of time integral to the length of the line segment for the predetermined time; and deciding that the acceleration is a generation of a resonance if the rate is below a predetermined value.

2. A start controlling method according to claim 1, further comprising changing a threshold value serving as a reference to decide whether or not the passenger protection system is started to avoid the start of the passenger protection system if said deciding operation decides that the acceleration is the resonance.

3. A start controlling method according to claim 1, further comprising changing a time integral value of the acceleration to avoid the start of the passenger protection system if said deciding operation decides that the acceleration is the resonance.

4. A start controlling system for controlling start of a passenger protection system which is so constructed that a protection system for protecting a passenger in a vehicle can be started in response to a start signal, said start controlling system comprising:

an acceleration deciding means for deciding whether or not an acceleration of the vehicle exceeds a predetermined magnitude, a speed integral value calculating means for calculating a speed integral value by executing a time integral of a succeedingly detected acceleration for a predetermined time if it is decided by said acceleration deciding means that the acceleration is in excess of the predetermined magnitude;

a line segment length calculating means for calculating a length of a line segment of the acceleration succeedingly detected for the predetermined time with a passage of time;

a rate deciding means for calculating a rate of an increment of time integral to the length of the line segment for the predetermined time, to decide whether or not the rate is smaller than a predetermined value;

a threshold value calculating means for calculating a threshold value serving as a reference to decide whether or not the passenger protection system is started, based on the acceleration of the vehicle, a threshold value changing means for changing the threshold value being calculated by said threshold value calculating means so as to not start the passenger protection system if it is decided by said rate deciding means that the rate is smaller than the predetermined value; and a start signal deciding/generating means for deciding whether or not the speed integral value calculated by said speed integral value calculating means exceeds the threshold value changed by said threshold value changing means if it is decided by said rate deciding means that the rate is smaller than the predetermined value, then deciding whether or not the speed integral value calculated by said speed integral value calculating means exceeds the threshold value calculated by said threshold value calculating means if it is decided by said rate deciding means that the rate is larger than the predetermined value, and then generating a start signal for the passenger protection system if it is decided in either case that the speed integral value exceeds the threshold value.

5. A start controlling system for controlling start of a passenger protection system which is so constructed that a protection system for protecting a passenger in a vehicle can be started in response to a start signal, said start controlling system comprising:

a microcomputer operable to execute predetermined processes by reading a predetermined program from an external device and executing the predetermined program, wherein said microcomputer is operable to:

decide whether or not an acceleration of the vehicle exceeds a predetermined magnitude, and then calculate a speed integral value by executing a time integral of a succeedingly detected acceleration for a predetermined time if it is decided that the acceleration exceeds the predetermined magnitude, calculate a length of a line segment of the acceleration succeedingly detected for the predetermined time with a passage of time, then calculate a rate of an increment of a speed integral value to the length of the line segment for the predetermined time, and then decide whether or not the rate of the increment of the speed integral value to the length of the line segment for the predetermined time is smaller than a predetermined value, calculate a threshold value serving as a reference to decide whether or not the passenger protection system is started, based on the acceleration of the vehicle, perform first decision processing, when the rate of the increment of the speed integral value to the length of the line segment for the predetermined time is decided to be smaller than the predetermined value, in order to change the threshold value in a direction to prevent start of the passenger protection system and to decide whether or not the speed integral value exceeds the changed threshold value, perform second decision processing, when the rate of the increment of the speed integral value to the length of the line segment for the predetermined time is decided to be larger than the predetermined value, in order to decide whether or not the speed integral value exceeds the threshold value before the change to the threshold value, and output a digital start signal for starting the passenger protection system if it is decided in the first decision processing that the speed integral value has exceeded the changed threshold value or it is decided in the second decision processing that the speed integral value has exceeded the threshold value before the change to the threshold value;

a digital/analogue converter operable to convert the digital start signal to be supplied from said microcomputer to an air bag system into an analogue signal; and an interface circuit operable to convert the analogue signal of said digital/analogue converter into a predetermined signal suitable for the air bag system.

6. A start controlling system for controlling start of a passenger protection system which is so constructed that a protection system for protecting a passenger in a vehicle can be started in response to a start signal, said start controlling system comprising:

an acceleration deciding means for deciding whether or not an acceleration of the vehicle exceeds a predetermined magnitude;

a speed integral value calculating means for calculating a speed integral value by executing a time integral of a succeedingly detected acceleration for a predetermined time if it is decided by said acceleration deciding means that the acceleration is in excess of the predetermined magnitude, a line segment length calculating means for calculating a length of a line segment of the acceleration succeedingly detected for the predetermined time with a passage of time;

a rate detecting means for calculating a rate of an increment of a speed integral value to the length of the line segment for the predetermined time, to decide whether or not the rate is smaller than a predetermined value;

a speed integral value changing means for changing the speed integral value calculated by said speed integral value calculating means to reduce the speed integral value's absolute value if it is decided by said rate deciding means that the rate is smaller than the predetermined value;

a threshold value calculating means for calculating a threshold value serving as a reference to decide whether or not the passenger protection system is started, based on the acceleration of the vehicle after it is decided by said rate deciding means that the rate is not smaller than the predetermined value or after the speed integral value is changed by said speed integral value changing means; and a start signal deciding/generating means for deciding whether or not the speed integral value exceeds the threshold value calculated by said threshold value calculating means, and then generating a start signal for the passenger protection system if it is decided that the speed integral value exceeds the threshold value.

7. A start controlling system for controlling start of a passenger protection system which is so constructed that a protection system for protecting a passenger in a vehicle can be started in response to a start signal, said start controlling system comprising:

a microcomputer operable to execute predetermined processes by reading a predetermined program from an external device and executing the predetermined program, wherein said microcomputer is further operable to:

decide whether or not an acceleration of the vehicle exceeds a predetermined magnitude, and then calculate a speed integral value by executing a time integral of a succeedingly detected acceleration for a predetermined time if it is decided that the acceleration exceeds the predetermined magnitude, calculate a length of a line segment of the acceleration succeedingly detected for the predetermined time with a passage of time, then calculate a rate of an increment of a speed integral value to the length of the line segment for the predetermined time, and then decide whether or not the rate of the increment of the speed integral value to the length of the line segment for the predetermined time is smaller than a predetermined value, change the speed integral value to reduce the speed integral value's absolute value if it is decided that the rate of the increment of the speed integral value to the length of the line segment for the predetermined time is smaller than the predetermined value, calculate a threshold value serving as a reference to decide whether or not the passenger protection system is started, based on the acceleration of the vehicle, after the speed integral value is changed or after it is decided that the rate of the increment of the speed integral value to the length of the line segment for the predetermined time is not smaller than the predetermined value, then decide whether or not the changed speed integral value exceeds the threshold value, and then generate a digital start signal of the passenger protection system if it is decided that the speed integral value exceeds the threshold value;

a digital/analogue converter operable to convert the digital start signal to be supplied from said microcomputer to an air bag system into an analogue signal; and an interface circuit for converting the analogue signal of said digital/analogue converter into a predetermined signal suitable for the air bag system.

8. A computer program embodied on a computer readable medium for use with a computer, said computer program comprising:

computer readable program code operable to cause the computer to decide whether or not an acceleration of a vehicle exceeds a predetermined value;

computer readable program code operable to cause the computer to execute a time integral of a succeedingly input acceleration for a predetermined time if it is decided that the acceleration of the vehicle exceeds the predetermined value;

computer readable program code operable to cause the computer to calculate a length of a line segment of the succeedingly input acceleration for the predetermined time with a passage of time if it is decided that the acceleration of the vehicle exceeds the predetermined value;

computer readable program code operable to cause the computer to calculate a rate of an increment of time integral to the length of the line segment for the predetermined time;

computer readable program code operable to cause the computer to decide whether or not the rate is below a predetermined value;

computer readable program code operable to cause the computer to decide that the acceleration is a generation of a resonance if it is decided that the rate is below the predetermined value, and then cause the computer to calculate a threshold value serving as a reference to decide whether or not the passenger protection system is started, according to a predetermined relation based on the acceleration;

computer readable program code operable to cause the computer to change the threshold value such that start of the passenger protection system can be avoided;

computer readable program code operable to cause the computer to decide whether or not the speed integral value exceeds the changed threshold value;

computer readable program code operable to cause the computer to generate a start signal of the passenger protection system if it is decided that the speed integral value exceeds the changed threshold value;

computer readable program code operable to cause the computer to decide whether or not the speed integral value exceeds the threshold value, which is calculated according to the predetermined relation based on the acceleration and serves as the reference to decide whether or not the passenger protection system is started, if it is decided that the rate of the increment of time integral to the length of the line segment for the predetermined time is not below the predetermined value; and computer readable program code operable to cause the computer to generate the start signal of the passenger protection system if it is decided that the speed integral value exceeds the threshold value which is calculated according to the predetermined relation based on the acceleration and serves as the reference to decide whether or not the passenger protection system is started.

9. A computer program embodied on a computer readable medium for use with a computer, said computer program comprising:

computer readable program code operable to cause the computer to decide whether or not an acceleration of a vehicle exceeds a predetermined value;

computer readable program code operable to cause the computer to execute a time integral of a succeedingly input acceleration for a predetermined time if it is decided that the acceleration of the vehicle exceeds the predetermined value;

computer readable program code operable to cause the computer to calculate a length of a line segment of the succeedingly input acceleration for the predetermined time with a passage of time if it is decided that the acceleration of the vehicle exceeds the predetermined value;

computer readable program code operable to cause the computer to calculate a rate of an increment of time integral to the length of the line segment for the predetermined time;

computer readable program code operable to cause the computer to decide whether or not the rate of the increment of time integral to the length of the line segment for the predetermined time is below the predetermined value;

computer readable program code operable to cause the computer to decide that the acceleration is a generation of a resonance if it is decided that the rate of the increment of time integral to the length of the line segment for the predetermined time is below the predetermined value, and then cause the computer to change the speed integral value such that start of the passenger protection system can be avoided;

computer readable program code operable to cause the computer to decide whether or not the changed speed integral value exceeds a threshold value which is calculated according to a predetermined relation based on the acceleration and serves as a reference to decide whether or not the passenger protection system is started;

computer readable program code operable to cause the computer to generate a start signal of the passenger protection system if it is decided that the chanced speed integral value exceeds the threshold value;

computer readable program code operable to cause the computer to decide whether or not the speed integral value exceeds the threshold value, which is calculated according to the predetermined relation based on the acceleration and serves as the reference to decide whether or not the passenger protection system is started, if it is decided that the rate of the increment of time integral to the length of the line segment for the predetermined time is not below the predetermined value; and computer readable program code operable to cause the computer to generate the start signal of the passenger protection system if it is decided that the speed integral value exceeds the threshold value.

* * * * *